US012609299B2

(12) United States Patent     (10) Patent No.:   US 12,609,299 B2

Nagy et al.      (45) Date of Patent:    Apr. 21, 2026

(54) PROTECTIVE PARTICLE COATINGS FOR ELECTROACTIVE MATERIAL PARTICLES AND METHODS OF FORMING THE SAME

(71) Applicant: GM GLOBAL TECHNOLOGY OPERATIONS LLC, Detroit, MI (US)

(72) Inventors: Sayed Youssef Sayed Nagy, Troy, MI (US); Caleb Reese, Ferndale, MI (US); Jeffrey David Cain, Royal Oak, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 789 days.

(21) Appl. No.: 17/880,515

(22) Filed: Aug. 3, 2022

(65)      Prior Publication Data

US 2024/0047653 A1     Feb. 8, 2024

(51) Int. Cl.
| | |
|---|---|
| *H01M 10/0525* | (2010.01) |
| *H01M 4/04* | (2006.01) |
| *H01M 4/36* | (2006.01) |
| *H01M 4/58* | (2010.01) |

(52) U.S. Cl.
CPC ......... *H01M 4/366* (2013.01); *H01M 4/0416* (2013.01); *H01M 4/5825* (2013.01); *H01M 10/0525* (2013.01)

(58) Field of Classification Search
None
See application file for complete search history.

(56)      References Cited

U.S. PATENT DOCUMENTS

| | | |
|---|---|---|
| 6,451,487 B1 | 9/2002 | Besner et al. |
| 7,018,607 B2 | 3/2006 | Nazri et al. |
| 7,285,260 B2 | 10/2007 | Armand et al. |

(Continued)

FOREIGN PATENT DOCUMENTS

| | | |
|---|---|---|
| CN | 1658411 A | 8/2005 |
| CN | 101107746 A | 1/2008 |

(Continued)

OTHER PUBLICATIONS

Sayed Youssef Sayed et al.; "Alternating Silicon and Carbon Multilayer-Structured Anodes Suppress Formation of the c-Li3.75Si Phase"; Chemistry of Materials; (2019); 31, pp. 6578-6589.

(Continued)

*Primary Examiner* — Carlos Barcena

(74) *Attorney, Agent, or Firm* — Harness, Dickey & Pierce, P.L.C.

(57)      ABSTRACT

The present disclosure provides a method for preparing an electroactive material for an electrochemical cell that cycles lithium ions. The method includes immersing a plurality of electroactive material particles in an aqueous solution and adding one or more fluorinated lithium salts to the aqueous solution to form a protective particle coating on each of the electroactive material particles of the plurality of electroactive material particles, where the plurality of electroactive material particles defines the electroactive material. The protective particle coatings are continuous coatings that cover greater than or equal to about 95% of a total exposed surface area of each electroactive material particle of the plurality of electroactive material particles.

20 Claims, 2 Drawing Sheets

(56) References Cited

U.S. PATENT DOCUMENTS

| | | | |
|---|---|---|---|
| 7,457,018 B2 | 11/2008 | Armand et al. |
| 7,491,467 B2 | 2/2009 | Satoh et al. |
| 7,651,732 B2 | 1/2010 | Cheng et al. |
| 7,722,994 B2 | 5/2010 | Halalay |
| 7,736,805 B2 | 6/2010 | Nazri et al. |
| 8,076,027 B2 | 12/2011 | Honda et al. |
| 8,101,152 B1 | 1/2012 | Halalay et al. |
| 8,148,455 B2 | 4/2012 | Posudievsky et al. |
| 8,247,116 B2 | 8/2012 | He et al. |
| 8,309,644 B1 | 11/2012 | Huang |
| 8,399,138 B2 | 3/2013 | Timmons |
| 8,420,259 B2 | 4/2013 | Xiao et al. |
| 8,440,350 B1 | 5/2013 | Verbrugge et al. |
| 8,455,140 B1 | 6/2013 | Huang et al. |
| 8,460,591 B2 | 6/2013 | Huang et al. |
| 8,460,829 B1 | 6/2013 | Huang et al. |
| 8,470,468 B2 | 6/2013 | Xiao et al. |
| 8,470,898 B2 | 6/2013 | Huang |
| 8,641,860 B2 | 2/2014 | Flores et al. |
| 8,642,201 B2 | 2/2014 | Cheng et al. |
| 8,658,295 B2 | 2/2014 | Cheng et al. |
| 8,679,680 B2 | 3/2014 | Vanimisetti et al. |
| 8,753,543 B2 | 6/2014 | Zhamu et al. |
| 8,828,481 B2 | 9/2014 | Burton et al. |
| 8,835,056 B2 | 9/2014 | Xiao et al. |
| 8,974,946 B2 | 3/2015 | Cai et al. |
| 8,999,584 B2 | 4/2015 | Jiang et al. |
| 9,012,075 B2 | 4/2015 | Verbrugge et al. |
| 9,034,519 B2 | 5/2015 | Xiao et al. |
| 9,059,451 B2 | 6/2015 | Xiao et al. |
| 9,093,705 B2 | 7/2015 | Xiao et al. |
| 9,123,939 B2 | 9/2015 | Xiao et al. |
| 9,142,830 B2 | 9/2015 | Xiao et al. |
| 9,153,819 B2 | 10/2015 | Huang et al. |
| 9,160,036 B2 | 10/2015 | Yang et al. |
| 9,356,281 B2 | 5/2016 | Verbrugge et al. |
| 9,362,551 B2 | 6/2016 | Sachdev et al. |
| 9,362,552 B2 | 6/2016 | Sohn et al. |
| 9,379,374 B2 | 6/2016 | Liu et al. |
| 9,531,004 B2 | 12/2016 | Xiao et al. |
| 9,564,639 B2 | 2/2017 | Huang |
| 9,947,915 B2 | 4/2018 | Kim et al. |
| 10,164,245 B2 | 12/2018 | Huang |
| 10,396,360 B2 | 8/2019 | Xiao et al. |
| 2005/0191556 A1 | 9/2005 | Kim et al. |
| 2005/0214644 A1 | 9/2005 | Aramata et al. |
| 2006/0147797 A1 | 7/2006 | Wu et al. |
| 2007/0099086 A1 | 5/2007 | Kang et al. |
| 2007/0202411 A1 | 8/2007 | Kim et al. |
| 2007/0238023 A1 | 10/2007 | Gorshkov et al. |
| 2007/0275302 A1 | 11/2007 | Sotowa et al. |
| 2008/0063939 A1 | 3/2008 | Ryu et al. |
| 2008/0226987 A1 | 9/2008 | Yumoto et al. |
| 2008/0261116 A1 | 10/2008 | Burton et al. |
| 2009/0111031 A1 | 4/2009 | Hirose et al. |
| 2009/0136415 A1 | 5/2009 | Gorshkov et al. |
| 2009/0140742 A1 | 6/2009 | Koch et al. |
| 2009/0155697 A1 | 6/2009 | Park et al. |
| 2009/0253042 A1 | 10/2009 | Sun et al. |
| 2009/0286157 A1 | 11/2009 | Chen et al. |
| 2009/0325071 A1 | 12/2009 | Verbrugge et al. |
| 2010/0079145 A1 | 4/2010 | Meisner et al. |
| 2010/0143790 A1 | 6/2010 | Inagaki et al. |
| 2010/0203392 A1 | 8/2010 | Yamada et al. |
| 2010/0272612 A1 | 10/2010 | Ramamurthy |
| 2010/0330421 A1 | 12/2010 | Cui et al. |
| 2011/0017528 A1 | 1/2011 | Kumar et al. |
| 2011/0027649 A1 | 2/2011 | Abe |
| 2011/0037436 A1 | 2/2011 | Seethaler et al. |
| 2011/0044886 A1 | 2/2011 | Gorshkov et al. |
| 2011/0086249 A1 | 4/2011 | Timmons |
| 2011/0086294 A1 | 4/2011 | Xiao et al. |
| 2011/0111294 A1 | 5/2011 | Lopez et al. |
| 2011/0111308 A1 | 5/2011 | Halalay et al. |
| 2011/0121225 A1 | 5/2011 | Posudievsky et al. |
| 2011/0151333 A1 | 6/2011 | Halalay et al. |
| 2011/0165459 A1 | 7/2011 | Halalay et al. |
| 2011/0166811 A1 | 7/2011 | Koch et al. |
| 2011/0189577 A1 | 8/2011 | Chung et al. |
| 2011/0200781 A1 | 8/2011 | Sowul et al. |
| 2011/0200863 A1 | 8/2011 | Xiao et al. |
| 2011/0224928 A1 | 9/2011 | Lin et al. |
| 2011/0250478 A1 | 10/2011 | Timmons et al. |
| 2011/0274962 A1 | 11/2011 | Inagaki et al. |
| 2012/0003533 A1 | 1/2012 | Dahn et al. |
| 2012/0086457 A1 | 4/2012 | Meisner et al. |
| 2012/0100403 A1 | 4/2012 | Wang et al. |
| 2012/0101674 A1 | 4/2012 | Wang et al. |
| 2012/0105068 A1 | 5/2012 | Wang et al. |
| 2012/0105069 A1 | 5/2012 | Wang et al. |
| 2012/0109503 A1 | 5/2012 | Yang et al. |
| 2012/0156568 A1 | 6/2012 | Kia et al. |
| 2012/0156569 A1 | 6/2012 | Kia et al. |
| 2012/0161757 A1 | 6/2012 | Koch et al. |
| 2012/0161776 A1 | 6/2012 | Koch et al. |
| 2012/0169297 A1 | 7/2012 | Schaefer et al. |
| 2012/0196183 A1 | 8/2012 | Chiga et al. |
| 2012/0208087 A1 | 8/2012 | Yamamoto et al. |
| 2012/0219852 A1 | 8/2012 | Huang et al. |
| 2012/0227252 A1 | 9/2012 | Nazri |
| 2012/0229096 A1 | 9/2012 | Nazri |
| 2012/0231321 A1 | 9/2012 | Huang et al. |
| 2012/0244390 A1 | 9/2012 | Cheng et al. |
| 2012/0244418 A1 | 9/2012 | Cheng et al. |
| 2012/0264017 A1 | 10/2012 | Nazri et al. |
| 2012/0301790 A1 | 11/2012 | Xiao et al. |
| 2012/0308853 A1 | 12/2012 | Vanimisetti et al. |
| 2012/0308872 A1 | 12/2012 | Huang |
| 2012/0328927 A1 | 12/2012 | Timmons et al. |
| 2013/0071736 A1 | 3/2013 | Xiao et al. |
| 2013/0071742 A1 | 3/2013 | Halalay et al. |
| 2013/0099159 A1 | 4/2013 | Halalay et al. |
| 2013/0122374 A1 | 5/2013 | Verbrugge et al. |
| 2013/0131200 A1 | 5/2013 | Huang |
| 2013/0157125 A1 | 6/2013 | Sachdev et al. |
| 2013/0175998 A1 | 7/2013 | Wang et al. |
| 2013/0177804 A1 | 7/2013 | Verbrugge et al. |
| 2013/0177808 A1 | 7/2013 | Wang et al. |
| 2013/0183582 A1 | 7/2013 | Halalay et al. |
| 2013/0189576 A1 | 7/2013 | Verbrugge et al. |
| 2013/0224602 A1 | 8/2013 | Huang |
| 2013/0234674 A1 | 9/2013 | Nazri |
| 2013/0284338 A1 | 10/2013 | Xiao et al. |
| 2013/0319599 A1 | 12/2013 | Huang |
| 2013/0323595 A1 | 12/2013 | Sohn et al. |
| 2014/0011089 A1 | 1/2014 | Yamada et al. |
| 2014/0023931 A1 | 1/2014 | Huang |
| 2014/0038024 A1 | 2/2014 | Huang |
| 2014/0113197 A1 | 4/2014 | Xiao et al. |
| 2014/0205905 A1 | 7/2014 | Xiao et al. |
| 2014/0265557 A1 | 9/2014 | Huang et al. |
| 2014/0272526 A1 | 9/2014 | Huang |
| 2014/0272558 A1 | 9/2014 | Xiao et al. |
| 2014/0272569 A1 | 9/2014 | Cai et al. |
| 2014/0272573 A1 | 9/2014 | Xiao et al. |
| 2014/0272578 A1 | 9/2014 | Xiao et al. |
| 2014/0272584 A1 | 9/2014 | Jiang et al. |
| 2014/0272603 A1 | 9/2014 | Yang et al. |
| 2015/0014890 A1 | 1/2015 | Xiao |
| 2015/0037651 A1 | 2/2015 | Huang |
| 2015/0162602 A1 | 6/2015 | Dadheech et al. |
| 2015/0180023 A1 | 6/2015 | Xiao et al. |
| 2015/0228980 A1 | 8/2015 | Huang |
| 2016/0093879 A1 | 3/2016 | Song et al. |
| 2017/0092950 A1 | 3/2017 | Xiao et al. |
| 2018/0076461 A1 | 3/2018 | Yamada et al. |
| 2018/0151865 A1* | 5/2018 | Song ..................... H01M 4/505 |

FOREIGN PATENT DOCUMENTS

| | | |
|---|---|---|
| CN | 101385163 A | 3/2009 |
| CN | 101728517 A | 6/2010 |
| CN | 101764209 A | 6/2010 |
| CN | 101986442 A | 3/2011 |

(56) References Cited

FOREIGN PATENT DOCUMENTS

| | | | |
|---|---|---|---|
| CN | 102306748 | A | 1/2012 |
| CN | 102760881 | A | 10/2012 |
| CN | 103779550 | A | 5/2014 |
| CN | 103943819 | A | 7/2014 |
| CN | 103996835 | A | 8/2014 |
| CN | 104701487 | A | 6/2015 |
| CN | 107403910 | A | 11/2017 |
| CN | 107845772 | A | 3/2018 |
| CN | 117525402 | A | 2/2024 |
| DE | 102013220351 | A1 | 4/2014 |
| DE | 102014118089 | A1 | 6/2015 |
| DE | 102017110902 | A1 | 11/2017 |
| DE | 102017121250 | A1 | 3/2018 |
| DE | 112017007080 | T5 | 12/2019 |
| DE | 102023100907 | A1 | 2/2024 |
| FR | 2965408 | A1 | 3/2012 |
| JP | 2007234255 | A | 9/2007 |
| WO | WO-2007094635 | A1 | 8/2007 |
| WO | WO-2012109218 | A2 | 8/2012 |
| WO | WO-2012132396 | A1 | 10/2012 |
| WO | WO-2014022986 | A1 | 2/2014 |
| WO | WO-2014182281 | A1 | 11/2014 |
| WO | WO-2015176241 | A1 | 11/2015 |

OTHER PUBLICATIONS

Aurbach, Doron, et al., "Design of electrolyte solutions for Li and Li-ion batteries: a review," Electrochimica Acta, vol. 50, pp. 247-254 (2004) (published online Aug. 3, 2004).

Bai, Ying, et al., "Microstructure and electrochemical performances of LiF-coated spinel $LiMn_2O_4$," Transactions of Nonferrous Metals Society of China, vol. 17, pp. s892-s896 (2007).

Gaines, Linda, et al., "Costs of Lithium-Ion Batteries for Vehicles," Argonne National Laboratory, Center for Transportation Research (May 2000).

George, Steven M., "Atomic Layer Deposition: An Overview," Chem. Rev., vol. 110, No. 1, pp. 111-131 (2010) (published online Nov. 30, 2009).

Goldstein, David N., et al., "$Al_2O_3$ Atomic Layer Deposition with Trimethylaluminum and Ozone Studied by in Situ Transmission FTIR Spectroscopy and Quadrupole Mass Spectrometry," J. Phys. Chem. C, vol. 112, No. 49, pp. 19530-19539 (2008) (published online Nov. 13, 2008).

Lee, Won-Jun, et al., "A Comparative Study on the Si Precursors for the Atomic Layer Deposition of Silicon Nitride Thin Films," Journal of the Korean Physical Society, vol. 45, No. 5, pp. 1352-1355 (Nov. 2004).

Leskelä, Markku, et al., "Atomic layer deposition (ALD): from precursors to thin film structures," Thin Solid Films, vol. 409, pp. 138-146 (2002).

Nikkei Electronics, "New Anode Material Could Boost Lithium Battery Performance by 30 Percent," available at http://www. greentechmedia.com/articles/read/new-anode-material-could-boost-lithium-battery-performance-by-30-percent (Nov. 2, 2010) (2 pages).

Qin, Yan, et al., "Mechanism of LTO Gassing and potential solutions," Argonne National Laboratory Presentation, May 9-13, 2011 (18 pages).

Ramadass, Premanand, et al., "Mathematical Modeling of SEI Formation in Li-Ion Cell Anodes," 202nd Meeting of The Electrochemical Society—Salt Lake City, UT, Oct. 20-25, 2002, (Abstract) (10 pages) (Oct. 23, 2002).

Vetter, J., et al., "Ageing mechanisms in lithium-ion batteries," J. Power Sources, vol. 147, Nos. 1-2, pp. 269-281 (Sep. 9, 2005).

Huntsman Corporation, JEFFAMINE® ED-2003 Polyetheramine Technical Bulletin, Form 5197-0208 (2007) (2 pages).

First Office Action for Chinese Patent Application No. 201410017174.9 issued Oct. 10, 2015 with correspondence dated Oct. 19, 2015 from China Patent Agent (H.K.) Ltd. summarizing contents; 12 pages.

Franssila, Sami, Introduction to Microfabrication, Second Ed., p. 53 (2010).

First Office Action for Chinese Patent Application No. 201310489603.8 issued Jul. 17, 2015 with correspondence dated Jul. 31, 2015 from China Patent Agent (H.K.) Ltd. summarizing contents; 12 pages.

Second Office Action for Chinese Patent Application No. 201310489603.8 issued Apr. 15, 2016 with correspondence dated May 22, 2016 from China Patent Agent (H.K.) Ltd. summarizing contents; 10 pages.

First Office Action for Chinese Patent Application No. 201410750591.4 issued Jul. 5, 2016 with correspondence dated Jul. 15, 2016 from China Patent Agent (H.K.) Ltd. summarizing contents; 9 pages.

Xiao, Xingcheng et al.; "Ultrathin Multifunctional Oxide Coatings for Lithium Ion Batteries"; Advanced Materials, vol. 23, No. 34; Jul. 22, 2011; pp. 3911-3915.

Yoon Seok Jung et al.; "Ultrathin Direct Atomic Layer Deposition on Composite Electrodes for Highly Durable and Safe Li-Ion Batteries"; Advanced Materials, vol. 22, No. 19; Apr. 6, 2010; pp. 2172-2176.

Second Office Action for Chinese Patent Application No. 201410017174.9 issued Aug. 3, 2016 with correspondence dated Aug. 17, 2016 from China Patent Agent (H.K.) Ltd. summarizing contents; 15 pages.

Xu, Zheng-Long et al.; "Electrospun Carbon Nanofiber Anodes Containing Monodispersed Si Nanoparticles and Graphene Oxide with Exceptional High Rate Capacities"; Nano Energy, vol. 6; May 2014; pp. 27-35.

Mavrič, Andraž et al. "Molecular size and solubility conditions of polysilane macromolecules with different topology" Scientific Reports, 6, 35450 (Oct. 17, 2016); doi:0.1038/srep35450.

First Office Action for Chinese Patent Application No. 201710321915.6 issued Jan. 2, 2020 with English language machine translation, 13 pages.

First Office Action for German Patent Application No. 102023100907.9 issued Jul. 21, 2025 with correspondence from Manitz Finsterwald Patent- und Rechtsanwaltspartnerschaft mbB, 4 pages.

* cited by examiner

110

120

PROTECTIVE PARTICLE COATINGS FOR ELECTROACTIVE MATERIAL PARTICLES AND METHODS OF FORMING THE SAME

INTRODUCTION

This section provides background information related to the present disclosure which is not necessarily prior art.

Advanced energy storage devices and systems are in demand to satisfy energy and/or power requirements for a variety of products, including automotive products such as start-stop systems (e.g., 12V start-stop systems), battery-assisted systems, hybrid electric vehicles ("HEVs"), and electric vehicles ("EVs"). Typical lithium-ion batteries include at least two electrodes and an electrolyte and/or separator. One of the two electrodes may serve as a positive electrode or cathode and the other electrode may serve as a negative electrode or anode. A separator filled with a liquid or solid electrolyte may be disposed between the negative and positive electrodes. The electrolyte is suitable for conducting lithium ions between the electrodes and, like the two electrodes, may be in solid and/or liquid form and/or a hybrid thereof. In instances of solid-state batteries, which include solid-state electrodes and a solid-state electrolyte (or solid-state separator), the solid-state electrolyte (or solid-state separator) may physically separate the electrodes so that a distinct separator is not required.

Conventional rechargeable lithium-ion batteries operate by reversibly passing lithium ions back and forth between the negative electrode and the positive electrode. For example, lithium ions may move from the positive electrode to the negative electrode during charging of the battery, and in the opposite direction when discharging the battery. Such lithium-ion batteries can reversibly supply power to an associated load device on demand. More specifically, electrical power can be supplied to a load device by the lithium-ion battery until the lithium content of the negative electrode is effectively depleted. The battery may then be recharged by passing a suitable direct electrical current in the opposite direction between the electrodes.

During discharge, the negative electrode may contain a comparatively high concentration of intercalated lithium, which is oxidized into lithium ions releasing electrons. Lithium ions may travel from the negative electrode to the positive electrode, for example, through the ionically conductive electrolyte solution contained within the pores of an interposed porous separator. Concurrently, electrons pass through an external circuit from the negative electrode to the positive electrode. Such lithium ions may be assimilated into the material of the positive electrode by an electrochemical reduction reaction. The battery may be recharged or regenerated after a partial or full discharge of its available capacity by an external power source, which reverses the electrochemical reactions that transpired during discharge.

In various instances, however, a portion of the intercalated lithium remains with the negative electrode following the first cycle due to, for example, conversion reactions and/or the formation of a solid electrolyte interphase (SEI) layer on the negative electrode during the first cycle, as well as ongoing lithium loss due to, for example, continuous solid electrolyte interphase breakage. Such permanent loss of lithium ions may result in a decreased specific energy and power in the battery resulting from, for example, added positive electrode mass that does not participate in the reversible operation of the battery. For example, the lithium-ion battery may experience an irreversible capacity loss of greater than or equal to about 5% to less than or equal to about 30% after the first cycle, and in the instance of silicon-containing negative electrodes, or other volume-expanding negative electroactive materials (e.g., tin (Sn), aluminum (Al), germanium (Ge)), an irreversible capacity loss of greater than or equal to about 20% to less than or equal to about 40% after the first cycle. Accordingly, it would be desirable to develop improved electrode materials, and methods of making and using the same, that can address these challenges.

SUMMARY

This section provides a general summary of the disclosure, and is not a comprehensive disclosure of its full scope or all of its features.

The present disclosure relates to electroactive material particles having protective particle coatings, to electrodes and electrochemical cells including the same, and also to methods of making and using the same.

In various aspects, the present disclosure provides a method for preparing an electroactive material for an electrochemical cell that cycles lithium ions. The method may include immersing a plurality of electroactive material particles in an aqueous solution and adding one or more fluorinated lithium salts to the aqueous solution to form a protective particle coating on each of the electroactive material particles of the plurality of electroactive material particles. The plurality of electroactive material particles defines the electroactive material.

In one aspect, each of the electroactive material particles of the plurality of electroactive material particles may include a volume-expanding material.

In one aspect, the volume-expanding material may be selected from the group consisting of: silicon, aluminum, bismuth, tin, antimony, germanium, and combinations thereof.

In one aspect, the one or more fluorinated lithium salts may be selected from the group consisting of: lithium hexafluorophosphate ($LiPF_6$), lithium tetrafluoroborate ($LiBF_4$), lithium bis(trifluoromethylsulfoyl)imide (LiTFSI), lithium bis(fluorosulfonyl)imide (LiFSI), hybrid salt lithium fluorosulfonyl-trifluorofulfonyl imide (LiFTFSI), lithium difluoro(oxalato)borate (LiDFOB), and combinations thereof.

In one aspect, an amount of the one or more fluorinated lithium salts may be added to the aqueous solution such that the aqueous solution has a concentration of the one or more fluorinated lithium salt of greater than or equal to about 1 mM to less than or equal to about 1 M.

In one aspect, the method may further include removing the plurality of electroactive material particles from the aqueous solution.

In one aspect, the plurality of electroactive material particles may be removed from the aqueous solution greater than or equal to about 5 minutes to less than or equal to about 24 hours.

In one aspect, the protective particle coating may have an average thickness greater than or equal to about 1 nanometer to less than or equal to about 5 micrometers.

In one aspect, the protective particle coatings may be continuous coatings that cover greater than or equal to about 95% of each electroactive material particles of the plurality of electroactive material particles.

In various aspects, the present disclosure provides a method for preparing an electroactive material for an electrochemical cell that cycles lithium ions. The method may include immersing a plurality of volume-expanding electroactive material particles in water and adding one or more fluorinated lithium salts to the water. The one or more fluorinated lithium salts decompose upon contact with the water to form a protective particle coating on each of the volume-explaining electroactive material particles of the plurality of volume-expanding electroactive material particles. The plurality of volume-expanding electroactive material particles defines the electroactive material.

In one aspect, each of the volume-expanding electroactive material particles of the plurality of volume-expanding electroactive material particles may include a volume-expanding material selected from the group consisting of: silicon, aluminum, bismuth, tin, antimony, germanium, and combinations thereof, and the one or more fluorinated lithium salts may be selected from the group consisting of: lithium hexafluorophosphate (LiPF$_6$), lithium tetrafluoroborate (LiBF$_4$), lithium bis(trifluoromethylsulfoyl)imide (LiTFSI), lithium bis(fluorosulfonyl)imide (LiFSI), hybrid salt lithium fluorosulfonyl-trifluorofulfonyl imide (LiFT-FSI), lithium difluoro(oxalato)borate (LiDFOB), and combinations thereof.

In one aspect, an amount of the one or more fluorinated lithium salts can be added to the water such that the water has a concentration of the one or more fluorinated lithium salt of greater than or equal to about 1 mM to less than or equal to about 1 M.

In one aspect, the method may further include removing the plurality of electroactive material particles from the water. The electroactive material particles may be removed after greater than or equal to about 5 minutes to less than or equal to about 24 hours.

In one aspect, the protective particle coating may have an average thickness greater than or equal to about 1 nanometer to less than or equal to about 5 micrometers.

In one aspect, the protective particle coating may be a continuous coatings that covers greater than or equal to about 95% of a total exposed surface area of each volume-explaining electroactive material particles of the plurality of volume-expanding electroactive material particles.

In various aspects, the present disclosure provides an electroactive material for an electrochemical cell that cycles lithium ions. The electroactive material may include a plurality of electroactive material particles, at least a portion of the electroactive material particles defining the plurality of electroactive material particles may include a volume-expanding material and may have protective particle coatings that includes lithium fluoride. The protective particle coatings are in direct contact with the electroactive material particles defining the portion of the electroactive material particles.

In one aspect, the volume-expanding material may be selected from the group consisting of: silicon, aluminum, bismuth, tin, antimony, germanium, and combinations thereof.

In one aspect, the portion of the electroactive material particles may have an average particle size greater than or equal to about 20 nanometers to less than or equal to about 100 micrometers.

In one aspect, the protective particle coatings may be continuous coatings that cover greater than or equal to about 95% of a total exposed surface area of each electroactive material particle defining the portion of the electroactive material particles.

In one aspect, the protective particle coatings may have an average thickness greater than or equal to about 1 nanometer to less than or equal to about 5 micrometers.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein is for illustrative purposes only of selected embodiments and not all possible implementations, and is not intended to limit the scope of the present disclosure.

Corresponding reference numerals indicate corresponding parts throughout the several views of the drawings.

DETAILED DESCRIPTION

Figure 1:
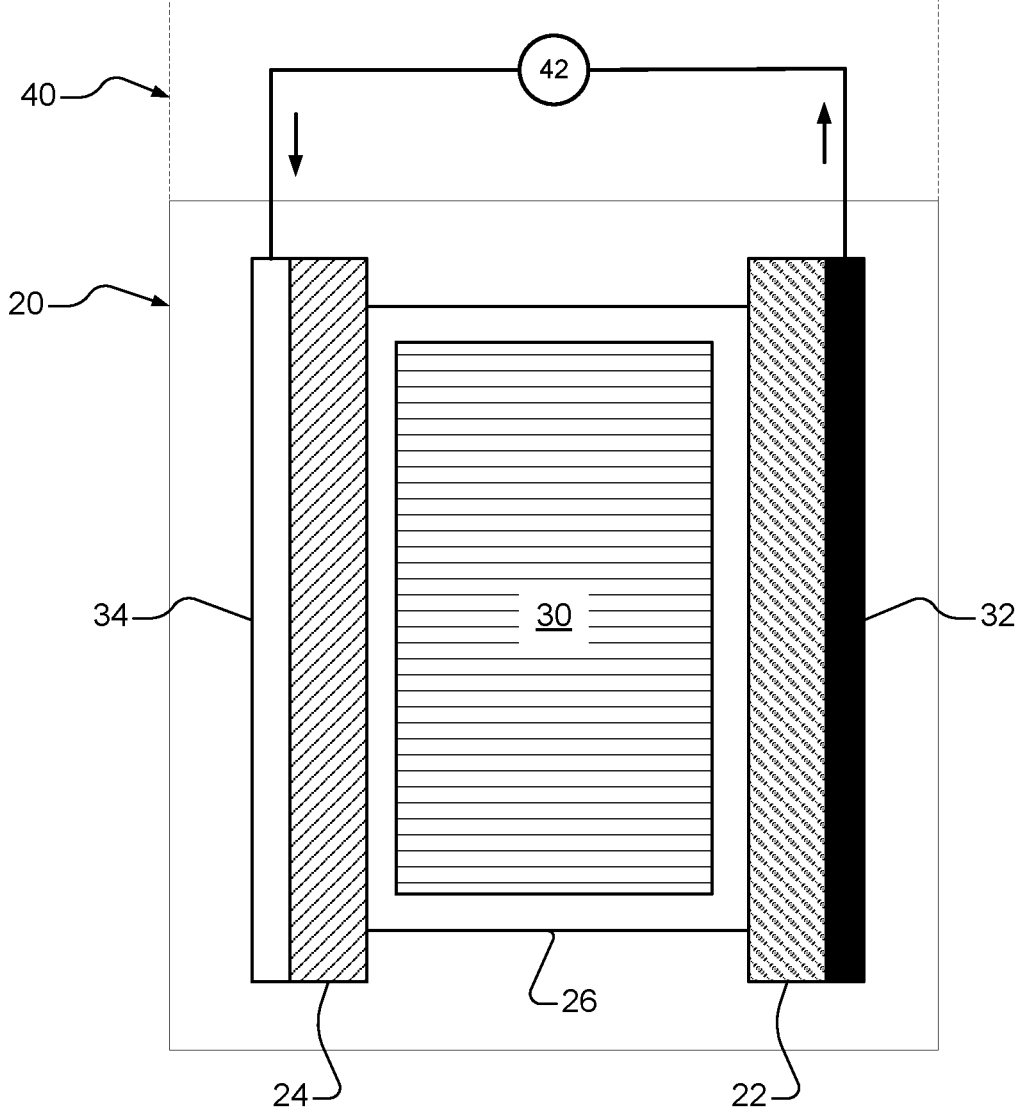
FIG. 1 is an illustration of an example electrochemical battery cell including electroactive material particles having protective particle coatings in accordance with various aspects of the present disclosure.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected, or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer, or section. Terms such as "first," "second," and other numerical terms when used herein do not imply a sequence or order unless clearly indicated by the context. Thus, a first step, element, component, region, layer, or section discussed below could be termed a second step, element, component, region, layer, or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates both exactly or precisely the stated numerical value, and also, that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawing.

The present technology relates to electrochemical cells including electroactive material particles having protective particle coatings, and also, to methods of forming and using the same. Such cells can be used in vehicle or automotive transportation applications (e.g., motorcycles, boats, tractors, buses, motorcycles, mobile homes, campers, and tanks). However, the present technology may also be employed in a wide variety of other industries and applications, including aerospace components, consumer goods, devices, buildings (e.g., houses, offices, sheds, and warehouses), office equipment and furniture, and industrial equipment machinery, agricultural or farm equipment, or heavy machinery, by way of non-limiting example. Further, although the illustrated examples detail below include a single positive electrode cathode and a single anode, the skilled artisan will recognize that the present teachings also extend to various other configurations, including those having one or more cathodes and one or more anodes, as well as various current collectors with electroactive layers disposed on or adjacent to one or more surfaces thereof.

An exemplary and schematic illustration of an electrochemical cell (also referred to as a battery) 20 is shown in FIG. 1. The battery 20 includes a negative electrode 22 (e.g., anode), a positive electrode 24 (e.g., cathode), and a separator 26 disposed between the two electrodes 22, 24. The separator 26 provides electrical separation-prevents physical contact-between the electrodes 22, 24. The separator 26 also provides a minimal resistance path for internal passage of lithium ions, and in certain instances, related anions, during cycling of the lithium ions. In various aspects, the separator 26 may include an electrolyte 30 that may, in certain aspects, also be present in the negative electrode 22 and/or the positive electrode 24, so as to form a continuous electrolyte network. In certain variations, the separator 26 may be formed by a solid-state electrolyte or a semi-solid-state electrolyte (e.g., gel electrolyte). For example, the separator 26 may be defined by a plurality of solid-state electrolyte particles. In the instance of solid-state batteries and/or semi-solid-state batteries, the positive electrode 24 and/or the negative electrode 22 may include a plurality of solid-state electrolyte particles. The plurality of solid-state electrolyte particles included in, or defining, the separator 26 may be the same as or different from the plurality of solid-state electrolyte particles included in the positive electrode 24 and/or the negative electrode 22.

A first current collector 32 (e.g., a negative current collector) may be positioned at or near the negative electrode 22 (which can also be referred to as a negative electroactive material layer). The first current collector 32 together with the negative electrode 22 may be referred to as a negative electrode assembly. Although not illustrated, the skilled artisan will appreciate that, in certain variations, negative electrodes 22 (also referred to as negative electroactive material layers) may be disposed on one or more parallel sides of the first current collector 32. Similarly, the skilled artisan will appreciate that, in other variations, a negative electroactive material layer may be disposed on a first side of the first current collector 32, and a positive electroactive material layer may be disposed on a second side of the first current collector 32. In each instance, the first current collector 32 may be a metal foil, metal grid or screen, or expanded metal comprising copper or any other appropriate electrically conductive material known to those of skill in the art.

A second current collector 34 (e.g., a positive current collector) may be positioned at or near the positive electrode 24 (which can also be referred to as a positive electroactive material layer). The second current collector 34 together with the positive electrode 24 may be referred to as a positive electrode assembly. Although not illustrated, the skilled artisan will appreciate that, in certain variations, positive electrodes 24 (also referred to as positive electroactive material layers) may be disposed on one or more parallel sides of the second current collector 34. Similarly, the skilled artisan will appreciate that, in other variations, a positive electroactive material layer may be disposed on a first side of the second current collector 34, and a negative electroactive material layer may be disposed on a second side of the second current collector 34. In each instance, the second electrode current collector 34 may be a metal foil, metal grid or screen, or expanded metal comprising aluminum or any other appropriate electrically conductive material known to those of skill in the art.

The first current collector 32 and the second current collector 34 may respectively collect and move free electrons to and from an external circuit 40. For example, an interruptible external circuit 40 and a load device 42 may connect the negative electrode 22 (through the first current collector 32) and the positive electrode 24 (through the second current collector 34). The battery 20 can generate an electric current during discharge by way of reversible electrochemical reactions that occur when the external circuit 40 is closed (to connect the negative electrode 22 and the positive electrode 24) and the negative electrode 22 has a lower potential than the positive electrode. The chemical potential difference between the positive electrode 24 and the negative electrode 22 drives electrons produced by a reaction, for example, the oxidation of intercalated lithium, at the negative electrode 22 through the external circuit 40 toward the positive electrode 24. Lithium ions that are also produced at the negative electrode 22 are concurrently transferred through the electrolyte 30 contained in the separator 26 toward the positive electrode 24. The electrons flow through the external circuit 40 and the lithium ions migrate across the separator 26 containing the electrolyte 30 to form intercalated lithium at the positive electrode 24. As noted above, the electrolyte 30 is typically also present in the negative electrode 22 and positive electrode 24. The electric current passing through the external circuit 40 can be harnessed and directed through the load device 42 until the lithium in the negative electrode 22 is depleted and the capacity of the battery 20 is diminished.

The battery 20 can be charged or re-energized at any time by connecting an external power source to the lithium ion battery 20 to reverse the electrochemical reactions that occur during battery discharge. Connecting an external electrical energy source to the battery 20 promotes a reaction, for example, non-spontaneous oxidation of intercalated lithium, at the positive electrode 24 so that electrons and lithium ions are produced. The lithium ions flow back toward the negative electrode 22 through the electrolyte 30 across the separator 26 to replenish the negative electrode 22 with lithium (e.g., intercalated lithium) for use during the next battery discharge event. As such, a complete discharging event followed by a complete charging event is considered to be a cycle, where lithium ions are cycled between the positive electrode 24 and the negative electrode 22. The external power source that may be used to charge the battery 20 may vary depending on the size, construction, and particular end-use of the battery 20. Some notable and exemplary external power sources include, but are not limited to, an AC-DC converter connected to an AC electrical power grid though a wall outlet and a motor vehicle alternator.

In many lithium-ion battery configurations, each of the first current collector 32, negative electrode 22, separator 26, positive electrode 24, and second current collector 34 are prepared as relatively thin layers (for example, from several microns to a fraction of a millimeter or less in thickness) and assembled in layers connected in electrical parallel arrangement to provide a suitable electrical energy and power package. In various aspects, the battery 20 may also include a variety of other components that, while not depicted here, are nonetheless known to those of skill in the art. For instance, the battery 20 may include a casing, gaskets, terminal caps, tabs, battery terminals, and any other conventional components or materials that may be situated within the battery 20, including between or around the negative electrode 22, the positive electrode 24, and/or the separator 26. The battery 20 shown in FIG. 1 includes a liquid electrolyte 30 and shows representative concepts of battery operation.

The size and shape of the battery 20 may vary depending on the particular application for which it is designed. Battery-powered vehicles and hand-held consumer electronic devices, for example, are two examples where the battery 20 would most likely be designed to different size, capacity, and power-output specifications. The battery 20 may also be connected in series or parallel with other similar lithium-ion cells or batteries to produce a greater voltage output, energy, and power if it is required by the load device 42. Accordingly, the battery 20 can generate electric current to a load device 42 that is part of the external circuit 40. The load device 42 may be powered by the electric current passing through the external circuit 40 when the battery 20 is discharging. While the electrical load device 42 may be any number of known electrically-powered devices, a few specific examples include an electric motor for an electrified vehicle, a laptop computer, a tablet computer, a cellular phone, and cordless power tools or appliances. The load device 42 may also be an electricity-generating apparatus that charges the battery 20 for purposes of storing electrical energy.

With renewed reference to FIG. 1, the positive electrode 24, the negative electrode 22, and the separator 26 may each include an electrolyte solution or system 30 inside their pores, capable of conducting lithium ions between the negative electrode 22 and the positive electrode 24. Any appropriate electrolyte 30, whether in solid, liquid, or gel form, capable of conducting lithium ions between the negative electrode 22 and the positive electrode 24 may be used in the lithium-ion battery 20. For example, in certain aspects, the electrolyte 30 may be a non-aqueous liquid electrolyte solution (e.g., >1 M) that includes a lithium salt dissolved in an organic solvent or a mixture of organic solvents. Numerous conventional non-aqueous liquid electrolyte 30 solutions may be employed in the battery 20.

A non-limiting list of lithium salts that may be dissolved in an organic solvent to form the non-aqueous liquid electrolyte solution include lithium hexafluorophosphate ($LiPF_6$), lithium perchlorate ($LiClO_4$), lithium tetrachloroaluminate ($LiAlCl_4$), lithium iodide (LiI), lithium bromide (LiBr), lithium thiocyanate (LiSCN), lithium tetrafluoroborate ($LiBF_4$), lithium tetraphenylborate ($LiB(C_6H_5)_4$), lithium bis(oxalato)borate ($LiB(C_2O_4)_2$) (LiBOB), lithium difluorooxalatoborate ($LiBF_2(C_2O_4)$), lithium hexafluoroarsenate ($LiAsF_6$), lithium trifluoromethanesulfonate ($LiCF_3SO_3$), lithium bis(trifluoromethane)sulfonylimide ($LiN(CF_3SO_2)_2$), lithium bis(fluorosulfonyl)imide (LiN $(FSO_2)_2$) (LiSFI), and combinations thereof. These and other similar lithium salts may be dissolved in a variety of non-aqueous aprotic organic solvents, including but not limited to, various alkyl carbonates, such as cyclic carbonates (e.g., ethylene carbonate (EC), propylene carbonate (PC), butylene carbonate (BC), fluoroethylene carbonate (FEC), vinylene carbonate (VC), and the like), linear carbonates (e.g., dimethyl carbonate (DMC), diethyl carbonate (DEC), ethylmethylcarbonate (EMC), and the like), aliphatic carboxylic esters (e.g., methyl formate, methyl acetate, methyl propionate, and the like), γ-lactones (e.g., γ-butyrolactone, γ-valerolactone, and the like), chain structure ethers (e.g., 1,2-dimethoxyethane, 1-2-diethoxyethane, ethoxymethoxyethane, and the like), cyclic ethers (e.g., tetrahydrofuran, 2-methyltetrahydrofuran, 1,3-dioxolane, and the like), sulfur compounds (e.g., sulfolane), and combinations thereof.

The separator 26 may include, in certain instances, a microporous polymeric separator including a polyolefin. The polyolefin may be a homopolymer (derived from a single monomer constituent) or a heteropolymer (derived from more than one monomer constituent), which may be either linear or branched. If a heteropolymer is derived from two monomer constituents, the polyolefin may assume any copolymer chain arrangement, including those of a block copolymer or a random copolymer. Similarly, if the polyolefin is a heteropolymer derived from more than two monomer constituents, it may likewise be a block copolymer or a random copolymer. In certain aspects, the polyolefin may be polyethylene (PE), polypropylene (PP), or a blend of polyethylene (PE) and polypropylene (PP), or multi-layered structured porous films of PE and/or PP. Commercially available polyolefin porous separator membranes 26 include CELGARD® 2500 (a monolayer polypropylene separator) and CELGARD® 2320 (a trilayer polypropylene/polyethylene/polypropylene separator) available from Celgard LLC.

When the separator 26 is a microporous polymeric separator, it may be a single layer or a multi-layer laminate, which may be fabricated from either a dry or a wet process. For example, in certain instances, a single layer of the polyolefin may form the entire separator 26. In other aspects, the separator 26 may be a fibrous membrane having an abundance of pores extending between the opposing surfaces and may have an average thickness of less than a millimeter, for example. As another example, however, multiple discrete layers of similar or dissimilar polyolefins may be assembled to form the microporous polymer separator 26. The separator 26 may also comprise other polymers in addition to the polyolefin such as, but not limited to, polyethylene terephthalate (PET), polyvinylidene fluoride (PVdF), a polyamide, polyimide, poly(amide-imide) copolymer, polyetherimide, and/or cellulose, or any other material suitable for creating the required porous structure. The polyolefin layer, and any other optional polymer layers, may further be included in the separator 26 as a fibrous layer to help provide the separator 26 with appropriate structural and porosity characteristics.

In certain aspects, the separator 26 may further include one or more of a ceramic material and a heat-resistant material. For example, the separator 26 may also be admixed with the ceramic material and/or the heat-resistant material. The ceramic material and/or the heat-resistant material may be disposed on one or more sides of the separator 26. The ceramic material may be selected from the group consisting of: alumina ($Al_2O_3$), silica ($SiO_2$), and combinations thereof. The heat-resistant material may be selected from the group consisting of: Nomex, Aramid, and combinations thereof.

Various conventionally available polymers and commercial products for forming the separator 26 are contemplated, as well as the many manufacturing methods that may be employed to produce such a microporous polymer separator 26. In each instance, the separator 26 may have an average thickness greater than or equal to about 1 micrometer (μm) to less than or equal to about 50 μm, and in certain instances, optionally greater than or equal to about 1 μm to less than or equal to about 20 μm.

In various aspects, the porous separator 26 and/or the electrolyte 30 disposed in the porous separator 26 as illustrated in FIG. 1 may be replaced with a solid-state electrolyte ("SSE") and/or semi-solid-state electrolyte (e.g., gel) that functions as both an electrolyte and a separator. For example, the solid-state electrolyte and/or semi-solid-state electrolyte may be disposed between the positive electrode 24 and negative electrode 22. The solid-state electrolyte and/or semi-solid-state electrolyte facilitates transfer of lithium ions, while mechanically separating and providing electrical insulation between the negative and positive electrodes 22, 24. By way of non-limiting example, the solid-state electrolyte and/or semi-solid-state electrolyte may include a plurality of fillers, such as $LiTi_2(PO_4)_3$, $LiGe_2$ $(PO_4)_3$, $Li_7La_3Zr_2O_{12}$, $Li_3xLa_{2/3-}xTiO_3$, $Li_3PO_4$, $Li_3N$, $Li_4GeS_4$, $Li_{10}GeP_2S_{12}$, $Li_2S—P_2S_5$, $Li_6PS_5Cl$, $Li_6PS_5Br$, $Li_6PS_5I$, $Li_3OCl$, $Li_{2.99}Ba_{0.005}ClO$, or combinations thereof. The semi-solid-state electrolyte may include a polymer host and a liquid electrolyte. The polymer host may include, for example, polyvinylidene fluoride (PVDF), polyvinylidene fluoride-hexafluoropropylene (PVDF-HFP), polyethylene oxide (PEO), polypropylene oxide (PPO), polyacrylonitrile (PAN), polymethacrylonitrile (PMAN), polymethyl methacrylate (PMMA), carboxymethyl cellulose (CMC), poly (vinyl alcohol) (PVA), polyvinylpyrrolidone (PVP), and combinations thereof. In certain variations, the semi-solid or gel electrolyte may also be found in the positive electrode 24 and/or the negative electrodes 22.

The positive electrode 24 is formed from a lithium-based active material that is capable of undergoing lithium intercalation and deintercalation, alloying and dealloying, or plating and stripping, while functioning as the positive terminal of a lithium-ion battery. The positive electrode 24 can be defined by a plurality of electroactive material particles. Such positive electroactive material particles may be disposed in one or more layers so as to define the three-dimensional structure of the positive electrode 24. The electrolyte 30 may be introduced, for example after cell assembly, and contained within pores of the positive electrode 24. In certain variations, the positive electrode 24 may include a plurality of solid-state electrolyte particles. In each instance, the positive electrode 24 may have an average thickness greater than or equal to about 1 μm to less than or equal to about 500 μm, and in certain aspects, optionally greater than or equal to about 10 μm to less than or equal to about 200 μm.

In various aspects, the positive electroactive material (also referred to as cathode active materials (CAM)) defining the positive electrode 24 includes a layered oxide represented by $LiMeO_2$, where Me is a transition metal, such as cobalt (Co), nickel (Ni), manganese (Mn), iron (Fe), aluminum (Al), vanadium (V), or combinations thereof. In other variations, the positive electroactive material includes an olivine-type oxide represented by $LiMePO_4$, where Me is a transition metal, such as cobalt (Co), nickel (Ni), manganese (Mn), iron (Fe), aluminum (Al), vanadium (V), or combinations thereof. In still other variations, the positive electroactive material includes a monoclinic-type oxide represented by $Li_3Me_2(PO_4)_3$, where Me is a transition metal, such as cobalt (Co), nickel (Ni), manganese (Mn), iron (Fe), aluminum (Al), vanadium (V), or combinations thereof. In still other variations, the positive electroactive material includes a spinel-type oxide represented by $LiMe_2O_4$, where Me is a transition metal, such as cobalt (Co), nickel (Ni), manganese (Mn), iron (Fe), aluminum (Al), vanadium (V), or combinations thereof.

In still other variations, the positive electroactive material includes a tavorite represented by $LiMeSO_4F$ and/or $LiMePO_4F$, where Me is a transition metal, such as cobalt (Co), nickel (Ni), manganese (Mn), iron (Fe), aluminum (Al), vanadium (V), or combinations thereof. In still further variations, the positive electrode 24 may be a composite electrode including a combination of positive electroactive materials. For example, the positive electrode 24 may include a first positive electroactive material and a second electroactive material. A ratio of the first positive electroactive material to the second positive electroactive material may be greater than or equal to about 5:95 to less than or equal to about 95:5. In certain variations, the first and second electroactive materials may be independently selected from one or more layered oxides, one or more olivine-type oxides, one or more monoclinic-type oxides, one or more spinel-type oxide, one or more tavorite, or combinations thereof.

In each variation, the positive electroactive material may also be optionally intermingled with an electronically conductive material (i.e. conductive additive) that provide an electron conductive path and/or a polymeric binder material that improve the structural integrity of the positive electrode 24. For example, the positive electrode 24 may include greater than or equal to about 30 wt. % to less than or equal to about 98 wt. %, and in certain aspects, optionally greater than or equal to about 60 wt. % to less than or equal to about 97 wt. %, of the positive electroactive material; greater than or equal to 0 wt. % to less than or equal to about 30 wt. %, and in certain aspects, optionally greater than or equal to about 0.5 wt. % to less than or equal to about 10 wt. %, of the electronically conducting material; and greater than or equal to 0 wt. % to less than or equal to about 20 wt. %, and in certain aspects, optionally greater than or equal to about 0.5 wt. % to less than or equal to about 10 wt. %, of the polymeric binder.

Example polymeric binders include polyimide, polyamic acid, polyamide, polysulfone, polyvinylidene difluoride (PVdF), polytetrafluoroethylene (PTFE), polyacrylic acid (PAA), blends of polyvinylidene fluoride and polyhexafluoropropene, polychlorotrifluoroethylene, ethylene propylene diene monomer (EPDM) rubber, carboxymethyl cellulose (CMC), nitrile butadiene rubber (NBR), styrene-butadiene rubber (SBR), lithium polyacrylate (LiPAA), sodium polyacrylate (NaPAA), sodium alginate, and/or lithium alginate. Electronically conducting materials may include, for example, carbon-based materials, powdered nickel or other metal particles, or a conductive polymer. Carbon-based materials may include, for example, particles of graphite, acetylene black (such as KETCHEN™ black or DENKA™ black), carbon nanofibers and nanotubes (e.g., single wall carbon nanotubes (SWCNT), multiwall carbon nanotubes (MWCNT)), graphene (e.g., graphene platelets (GNP), oxidized graphene platelets), conductive carbon blacks (such as, SuperP (SP)), and the like. Examples of a conductive polymer include polyaniline, polythiophene, polyacetylene, polypyrrole, and the like.

The negative electrode 22 is formed from a lithium host material that is capable of functioning as a negative terminal of a lithium-ion battery. In various aspects, the negative electrode 22 may be defined by a plurality of negative electroactive material particles. Such negative electroactive material particles may be disposed in one or more layers so as to define the three-dimensional structure of the negative electrode 22. The electrolyte 30 may be introduced, for example after cell assembly, and contained within pores of the negative electrode 22. In each instance, the negative electrode 22 (including the one or more layers) may have a thickness greater than or equal to about 0 nanometer (nm) to less than or equal to about 500 μm, optionally greater than or equal to about 1 μm to less than or equal to about 500 μm, and in certain aspects, optionally greater than or equal to about 10 μm to less than or equal to about 200 μm.

In certain variations, the negative electrode 22 may include a silicon-based electroactive material, including, for example, silicon (Si), two-dimensional (2D) silicon, lithiated silicon (e.g., $Li_xSi$, where $0 \leq x \leq 4.4$), silicon containing binary alloys (e.g., $SiO_x$, where $0 \leq x \leq 2$ and/or Si—Sn), and/or silicon containing ternary alloys (e.g., SiSnFe, SiSnAl, and/or SiFeCo). In other variations, the negative electrode 22 may include, for example, one or more other volume-expanding negative electroactive materials (e.g., aluminum (Al), germanium (Ge), and/or tin (Sn)). In still other variations, the negative electrode 22 may include, for example, carbonaceous negative electroactive materials (such as, graphite, hard carbon, soft carbon, and the like). In still other variations, the negative electrode 22 may include, for example, metallic negative electroactive active materials (such as tin, aluminum, magnesium, germanium, antimony, bismuth, and alloys thereof, and the like).

In further variations, the negative electrode 22 may be a composite electrode including a combination of negative electroactive materials. For example, the negative electrode 22 may include a first negative electroactive material and a second negative electroactive material. A ratio of the first negative electroactive material to the second negative electroactive material may be greater than or equal to about 5:95 to less than or equal to about 95:5. In certain variations, the first negative electroactive material may be a volume-expanding material including, for example, silicon, aluminum, germanium, and/or tin; and the second negative electroactive material may include, for example, a carbonaceous material (e.g., graphite, hard carbon, and/or soft carbon). For example, in certain variations, the negative electroactive material may include a carbonaceous-silicon based composite including, for example, about 10 wt. % $SiO_x$ (where $0 \leq x \leq 2$) and about 90 wt. % graphite.

Figure 2:
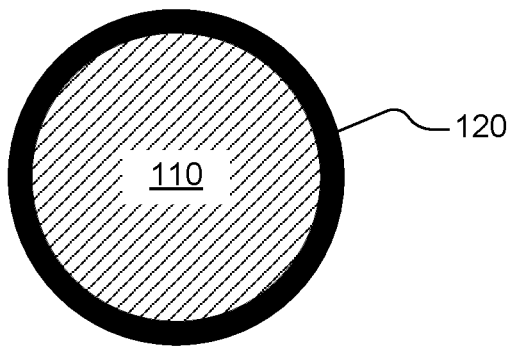
FIG. 2 is an illustration of an example electrochemical material particles having a protective coating in accordance with various aspects of the present disclosure.

In each instance, at least a portion of the plurality of negative electroactive material particles that define the negative electrode 22 includes a protective particle coating. For example, FIG. 2 illustrates an example negative electroactive material particle 110. As illustrated, the protective particle coating 120 may be a substantially continuous coating covering (e.g., disposed on) greater than or equal to about 85%, optionally greater than or equal to about 90%, optionally greater than or equal to about 95%, optionally greater than or equal to about 98%, optionally greater than or equal to about 99%, and in certain aspects, optionally greater than or equal to about 99.5%, of a total exposed surface area of the negative electroactive material particle 110. The negative electroactive material particle 110 may have a particle size greater than or equal to about 20 nanometers (nm) to less than or equal to about 100 μm, optionally greater than or equal to about 1 μm to less than or equal to about 10 μm, and in certain aspects, optionally greater than or equal to about 5 μm to less than or equal to about 10 μm; and the protective particle coating 120 may have an average thickness greater than or equal to about 1 nm to less than or equal to about 5 μm, and in certain aspects, optionally greater than or equal to about 5 nm to less than or equal to about 1 μm.

In certain variations, the protective particle coating 120 may include lithium fluoride (LiF), which has both a high surface diffusivity for lithium ions and also high mechanical strength (i.e. high modulus), such that the protective particle coating 120 can work to suppress the expansion and pulverization of expandable materials (like silicon, tin, antimony, bismuth, and/or germanium). In certain instances, the protective particle coating 120 may also define an artificial solid-electrolyte interphase (SEI) layer that can work to minimize the interaction of the negative electroactive material particle with the electrolyte 30 so as to lower initial irreversible capacity loss and improve initial Coulombic Efficiency (CE).

In various aspects, the present disclosure provides methods for forming protective particle coatings on electroactive material particles. For example, an example method for forming a protective particle coating, like the protective particle coating 120 illustrated in FIG. 2, may include contacting (e.g., immersing) the negative electroactive material particles (including particles that are nanometer and/or micrometer in scale) with an aqueous solution and adding one or more fluorinated lithium salts to the aqueous solution. The one or more fluorinated lithium salts may decompose upon contact with the aqueous solution (i.e., water) to form the lithium fluoride particle coating. For example, when lithium hexafluorophosphate (LiPF$_6$) is added to the aqueous solution the following conversion occurs:

$$LiPF_6 + H_2O \rightarrow LiF + PF_5 \quad\quad (I)$$

$$PF_5 + H_2O \rightarrow POF_3 + 2HF \quad\quad (II)$$

$$POF_3 + H_2O \rightarrow HPO_2F_2 + HF \quad\quad (III)$$

Because of the presence of hydrofluoric acid (HF) in the solution, the silicon-containing electroactive material (e.g., native silicon oxide) is expected to dissolve. For example, in accordance with the following conversions:

$$SiO_2 + 6HF \rightarrow H_2SiF_6 + 2H_2O \quad\quad (IV)$$

$$H_2SiF_6 \rightarrow SiF_4(g) + 6HF \quad\quad (V)$$

In this manner, this method is expected to dissolve any native oxides such that the lithium fluoride particle coating can be in direct contact with the negative electroactive material particles (e.g., silicon) without any oxides disposed therebetween. The surface of the negative electroactive material particles (e.g., silicon) can be substantially free of oxides.

The thickness of the protective particle coating may be a function of the immersion time and concentration of the one or more fluorinated lithium salts in the aquas solution, which allows the thickness of the protective particle coating to be tuned over a wider range of particle sizes (including particles having particle size that are nanometer and/or micrometer in scale). In certain instances, the one or more fluorinated lithium salts may be added such that the aqueous solution has a salt concentration greater than or equal to about 1 mM to less than or equal to about 1 M, and in certain aspects, optionally greater than or equal to about 1 mM to less than or equal to about 10 mM; and the negative electroactive material particles immersing in the aqueous solution, following the addition of the one or more fluorinated lithium salts, for a period greater than or equal to about 5 minutes to less than or equal to about 24 hours, and in certain aspects, optionally greater than or equal to about 15 minutes to less than or equal to about 1 hours. The one or more fluorinated lithium salts may include, for example, lithium hexafluorophosphate (LiPF$_6$), lithium tetrafluoroborate (LiBF$_4$), lithium bis(trifluoromethylsulfoyl)imide (LiTFSI), lithium bis(fluorosulfonyl)imide (LiFSI), hybrid salt lithium fluorosulfonyl-trifluorofulfonyl imide (LiFT-FSI), lithium difluoro(oxalato)borate (LiDFOB), and combinations thereof.

The method may include filtering the aqueous solution following the addition of the one or more fluorinated lithium salts to remove the residual materials (e.g., HPO$_2$F$_2$, HF). The method may also include isolating the coated electroactive material particles using, for example, a drying process. The drying process may include applying a temperature greater than or equal to about 40° C. to less than or equal to about 100° C. Further still, the method may include disposing the electroactive material particles with other electrode materials (e.g. conductive additives, binders, etc.) to form a negative electrode (like the negative electrode 22 illustrated in FIG. 1).

With renewed reference to FIG. 1, in certain variations, the negative electroactive material may be optionally intermingled with an electronically conductive material (i.e. conductive additive) that provide an electron conductive path and/or a polymeric binder material that improve the structural integrity of the negative electrode 22. For example, the negative electrode 22 may include greater than or equal to about 30 wt. % to less than or equal to about 98 wt. %, and in certain aspects, optionally greater than or equal to about 60 wt. % to less than or equal to about 95 wt. %, of the negative electroactive material; greater than or equal to 0 wt. % to less than or equal to about 30 wt. %, and in certain aspects, optionally greater than or equal to about 0.5 wt. % to less than or equal to about 10 wt. %, of the electronically conducting material; and greater than or equal to 0 wt. % to less than or equal to about 20 wt. %, and in certain aspects, optionally greater than or equal to about 0.5 wt. % to less than or equal to about 10 wt. %, of the polymeric binder. The conductive additive and/or binder material as included in the negative electrode 22 may be the same as or different from the conductive additive as included in the positive electrode 24.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for preparing an electroactive material for an electrochemical cell that cycles lithium ions, the method comprising:

immersing a plurality of electroactive material particles in water; and adding one or more fluorinated lithium salts to the water to form a protective particle coating on each of the electroactive material particles of the plurality of electroactive material particles, the plurality of electroactive material particles defining the electroactive material.

2. The method of claim 1, wherein each of the electroactive material particles of the plurality of electroactive material particles comprises a volume-expanding material.

3. The method of claim 2, wherein the volume-expanding material is selected from the group consisting of: silicon, aluminum, bismuth, tin, antimony, germanium, and combinations thereof.

4. The method of claim 1, wherein the one or more fluorinated lithium salts are selected from the group consisting of: lithium hexafluorophosphate (LiPF$_6$), lithium tetrafluoroborate (LiBF$_4$), lithium bis(trifluoromethylsulfoyl)imide (LiTFSI), lithium bis(fluorosulfonyl)imide (LiFSI), hybrid salt lithium fluorosulfonyl-trifluorofulfonyl imide (LiFTFSI), lithium difluoro (oxalato) borate (LiDFOB), and combinations thereof.

5. The method of claim 1, wherein an amount of the one or more fluorinated lithium salts is added to the water such that the water has a concentration of the one or more fluorinated lithium salt of greater than or equal to about 1 mM to less than or equal to about 1 M.

6. The method of claim 1, wherein the method further comprises:

removing the plurality of electroactive material particles from the water.

7. The method of claim 6, wherein the plurality of electroactive material particles is removed from the water greater than or equal to about 5 minutes to less than or equal to about 24 hours.

8. The method of claim 1, wherein the protective particle coating has an average thickness greater than or equal to about 1 nanometer to less than or equal to about 5 micrometers.

9. The method of claim 1, wherein the protective particle coatings are continuous coatings covering greater than or equal to about 95% of a total exposed surface area of each electroactive material particles of the plurality of electroactive material particles.

10. A method for preparing an electroactive material for an electrochemical cell that cycles lithium ions, the method comprising:

immersing a plurality of volume-expanding electroactive material particles in water; and adding one or more fluorinated lithium salts to the water, the one or more fluorinated lithium salts decomposing upon contact with the water to form a protective particle coating on each of the volume-explaining electroactive material particles of the plurality of volume-expanding electroactive material particles, the plurality of volume-expanding electroactive material particles defining the electroactive material.

11. The method of claim 10, wherein each of the volume-expanding electroactive material particles of the plurality of volume-expanding electroactive material particles comprises a volume-expanding material selected from the group consisting of: silicon, aluminum, bismuth, tin, antimony, germanium, and combinations thereof; and the one or more fluorinated lithium salts are selected from the group consisting of: lithium hexafluorophosphate (LiPF$_6$), lithium tetrafluoroborate (LiBF$_4$), lithium bis(trifluoromethylsulfoyl)imide (LiTFSI), lithium bis(fluorosulfonyl)imide (LiFSI), hybrid salt lithium fluorosulfonyl-trifluorofulfonyl imide (LiFTFSI), lithium difluoro (oxalato) borate (LiDFOB), and combinations thereof.

12. The method of claim 10, wherein an amount of the one or more fluorinated lithium salts is added to the water such that the water has a concentration of the one or more fluorinated lithium salt of greater than or equal to about 1 mM to less than or equal to about 1 M.

13. The method of claim 10, wherein the method further comprises:

removing the plurality of electroactive material particles from the water after greater than or equal to about 5 minutes to less than or equal to about 24 hours.

14. The method of claim 10, wherein the protective particle coating has average thickness greater than or equal to about 1 nanometer to less than or equal to about 5 micrometers.

15. The method of claim 10, wherein the protective particle coating is continuous coatings covering greater than or equal to about 95% of a total exposed surface area of each volume-explaining electroactive material particles of the plurality of volume-expanding electroactive material particles.

16. A method for preparing an electroactive material for an electrochemical cell that cycles lithium ions, the method comprising:

contacting a plurality of electroactive material particles with one or more fluorinated lithium salts in water to form a protective particle coating on each of the electroactive material particles of the plurality of electroactive material particles, the plurality of electroactive material particles defining the electroactive material.

17. The method of claim 16, wherein the each of the electroactive material particles of the plurality of electroactive material particles comprises a volume-expanding material selected from the group consisting of: silicon, aluminum, bismuth, tin, antimony, germanium, and combinations thereof.

18. The method of claim 16, wherein the one or more fluorinated lithium salts are selected from the group consisting of: lithium hexafluorophosphate (LiPF$_6$), lithium tetrafluoroborate (LiBF$_4$), lithium bis(trifluoromethylsulfoyl)imide (LiTFSI), lithium bis(fluorosulfonyl)imide (LiFSI), hybrid salt lithium fluorosulfonyl-trifluorofulfonyl imide (LiFTFSI), lithium difluoro(oxalato)borate (LiDFOB), and combinations thereof.

19. The method of claim 16, wherein the water has a concentration of the one or more fluorinated lithium salt of greater than or equal to about 1 mM to less than or equal to about 1 M.

20. The method of claim 16, wherein the method further comprises:

removing the plurality of electroactive material particles from contact with the one or more fluorinated lithium salts after greater than or equal to about 5 minutes to less than or equal to about 24 hours, each protective particle coating having an average thickness greater than or equal to about 1 nanometer to less than or equal to about 5 micrometers and covering greater than or equal to about 95% of a total exposed surface area of each electroactive material particles of the plurality of electroactive material particles.

\* \* \* \* \*